United States Patent
Takada et al.

(10) Patent No.: US 7,569,269 B2
(45) Date of Patent: Aug. 4, 2009

(54) HARD COAT FILM, ANTIREFLECTION HARD COAT FILM, OPTICAL ELEMENT AND IMAGE DISPLAY

(75) Inventors: Katsunori Takada, Ibaraki (JP); Daisuke Hamamoto, Ibaraki (JP); Takayuki Shigematsu, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 146 days.

(21) Appl. No.: 10/588,548

(22) PCT Filed: Sep. 26, 2005

(86) PCT No.: PCT/JP2005/017601

§ 371 (c)(1),
(2), (4) Date: Aug. 7, 2006

(87) PCT Pub. No.: WO2006/038481

PCT Pub. Date: Apr. 13, 2006

(65) Prior Publication Data

US 2007/0178297 A1    Aug. 2, 2007

(30) Foreign Application Priority Data

Oct. 6, 2004  (JP)  ............................. 2004-293935

(51) Int. Cl.
*B32B 27/32* (2006.01)
*B32B 5/16* (2006.01)
*B32B 27/40* (2006.01)
*G02B 27/00* (2006.01)

(52) U.S. Cl. .................. 428/323; 428/220; 428/328; 428/329; 428/331; 428/332; 428/423.1; 359/601

(58) Field of Classification Search .................. None
See application file for complete search history.

(56) References Cited

U.S. PATENT DOCUMENTS

| 5,747,152 | A | * | 5/1998 | Oka et al. .................. 428/323 |
| 6,329,041 | B1 | | 12/2001 | Tsuchiya et al. |
| 6,562,440 | B1 | | 5/2003 | Tsuchiya et al. |
| 6,916,540 | B2 | * | 7/2005 | Nishikawa et al. ....... 428/423.9 |
| 2004/0109070 | A1 | | 6/2004 | Jung |

FOREIGN PATENT DOCUMENTS

| JP | 9-113728 A | 5/1997 |
| JP | 11-300873 A | 11/1999 |
| JP | 2000-52472 A | 2/2000 |
| JP | 2000-112379 A | 4/2000 |
| JP | 2002-0077097 A | 10/2002 |
| JP | 2003-213025 A | 7/2003 |
| JP | 2004-9395 A | 1/2004 |
| KR | 1999-0072670 A | 9/1999 |

OTHER PUBLICATIONS

Office Action of Corresponding Korean Patent Application No. 10-2006-7003968 dated Jan. 16, 2007.
International Preliminary Report on Patentability of Corresponding International Application No. PCT/JP2005/017601 mailed Apr. 19, 2007.
International Search Report of PCT/JP2005/017601, date of mailing Oct. 25, 2005.

* cited by examiner

*Primary Examiner*—Sheeba Ahmed
(74) *Attorney, Agent, or Firm*—Westerman, Hattori, Daniels & Adrian, LLP.

(57) ABSTRACT

A hard coat film of the present invention comprises a hard coat layer, which is a cured coat layer, provided on at least one side of a transparent plastic film substrate, wherein a hard coat layer forming material comprises urethane acrylate (A); isocyanuric acid acrylate (B) and inorganic ultrafine particles (C), and has a high hardness and suppresses curling due to cracking and cure shrinkage.

18 Claims, 1 Drawing Sheet

HARD COAT FILM, ANTIREFLECTION HARD COAT FILM, OPTICAL ELEMENT AND IMAGE DISPLAY

TECHNICAL FIELD

The invention relates to a hard coat film and an antireflection hard coat film, both comprising a transparent plastic film substrate on at least one side of which a hard coat layer is provided. Moreover, the invention relates to an optical element such as a polarizing plate using the hard coat film or the antireflection hard coat film. A hard coat film, an antireflection hard coat film and an optical element of the invention are preferably used in image display, especially in CRT, a liquid crystal display (LCD), plasma display (PDP), an EL display (ELD) or the like.

BACKGROUND ART

As LCDs, one of many types of image displays, have been technically improved to provide wide viewing angles, high resolution, high response, good color reproduction, and the like, applications of LCDs are spreading from laptop personal computers and monitors to television sets. In a basic LCD structure, two flat glass substrates each provided with a transparent electrode are opposed via a spacer to form a constant gap, between which a liquid crystal material is placed and sealed to form a liquid crystal cell, and a polarizing plate is adhered on the outside surface of each flat glass substrates. In a conventional technique, a glass or plastic cover plate is attached to the surface of a liquid crystal cell in order to prevent scratches on a polarizing plate bonded to the surface of the liquid crystal cell because of low scratch resistance of the polarizing plate. However, the placement of such a cover plate is disadvantageous in terms of cost and weight. Thus, a hard-coating process has gradually been used to treat the surface of polarizing plates. The hard-coating process is commonly conducted in a way such that a hard coat film comprising a transparent plastic substrate on which a hard coat layer is formed is provided on a side of a polarizing plate.

The hard coat layer is formed as a thin coat film with a thickness in the range about from 2 to 10 µm on a transparent plastic film substrate using a thermoset resin or an ionizing radiation curable resin such as an ultraviolet curable resin. Since a thickness in the range is insufficient as a thickness of the hard coat layer, it has been common that even a hard coat resin having a characteristic of a pencil hardness of 4H or higher being coated on glass, suffers an influence of a transparent plastic film substrate, which is an underlying base, and a surface hardness of a hard coat layer formed on a transparent plastic film substrate is reduced to 2H or lower in pencil hardness.

LCD applications have come to include home television sets, and thus it is easily expected that the users of general home television sets should handle LCD television sets in the same manner as in the case of glass CRT television sets. Glass CRTs have a pencil hardness of about 9H, which significantly differs from that of current hard coat films. Thus, hard coat films have been required to have higher hardness, even if it cannot reach a pencil hardness of 9H.

Besides, in a case where a hard coat film is adhered onto various kinds of image displays, visibility of a display is reduced by light reflection on a display surface, which is on a polarizing plate surface. Hence, more improvement on visibility is required to a hard coat film.

It is thought simply to increase a thickness of a hard coat layer as a method increasing a hardness of a hard coat layer. Though hardness is increased in such a method, cracking and peeling in a hard coat layer occurs with ease and at the same time, curling due to cure shrinkage of a hard coat layer increases, which negates practicality of such a hard coat layer. In recent years, proposals have been offered of a method in which not only a high hardness of a hard coat film realized but also a problem of cracking or curling due to cure shrinkage in a hard coat layer is solved (JP-A No. 9-113728, JP-A No. 11-300873, JP-A No. 2000-52472 and JP-A No. 2000-112379).

A proposal has been offered in JP-A No. 9-113728 of a protective film for a polarizing plate comprising a transparent plastic film substrate on at least one side of which a cured coat layer (hard coat layer) is formed that is made from a composition containing an ultraviolet curable polyol acrylate-based resin. Dipentaerythritol hexaacrylate is mainly exemplified as an ultraviolet curable polyol acrylate-based resin. In a case where the resin is coated on a plastic film substrate, a thickness of a cured coat layer of 10 µm or more can secure a pencil hardness of 4H or higher, whereas curling due to cure shrinkage is hard to be suppressed at the same time.

A proposal has been offered JP-A No. 11-300873 of a hard coat film comprising a transparent plastic film substrate on at least one side of which a cushioning layer is formed that has a thickness in the range of 3 to 50 µm, constituted of a single layer or a multiple of layers and a hard coat layer is formed thereon that has a thickness in the range of 3 to 15 µm. Pencil hardness values of the transparent plastic film substrate, the cushioning layer and a hard coat layer increase in the order, with which structure the hard coat film is designed to have a pencil hardness in the range of from 4H to 8H as a whole. In JP-A No. 11-300873, however, a cushioning layer is required in addition to a hard coat layer and at least a two layer structure is required, leading to a fault to give a load in a fabrication process.

A proposal has been offered in JP-A No. 2000-52472 of a construction in which a cured resin layer containing inorganic or organic internally crosslinked ultrafine particles as a first hard coat layer is formed on at least one side of a transparent plastic film or a sheet substrate and thereafter, a thin film as a second hard coat layer is formed thereon that is made of a clear cured resin not containing inorganic or organic internally crosslinked particles. JP-A No. 2000-52472, however, also has, in a similar way as that in JP-A No. 11-300873, a fault that a load is given to a fabrication process because of a two layer structure.

A proposal has been offered in JP-A No. 2000-112379 of a construction in which a hard coat film is constituted of a transparent plastic film substrate on at least one side of which a hard coat layer having at least one layer is formed, wherein the hard coat layer forming material contains inorganic particles in the range of from 20 to 80 parts by weight relative to 100 parts by weight of a resin, a thickness of the hard coat layer as a whole is in the range of from 10 µm to 50 µm and a surface pencil hardness is 4H or higher. However, in a case where a hard coat layer with a thickness of 10 µm or more is formed on a transparent plastic film substrate with a hard coat forming material containing inorganic fine particles in the range relative to the resin such as polyester acrylate or polyurethane acrylate, which is used in JP-A No. 2000-112379, difficulty is encountered striking a balance between securement of a sufficient hardness and a suppression of curling due to cure shrinkage.

DISCLOSURE OF INVENTION

It is an object of the invention to provide a hard coat film comprising a hard coat layer, which is a cured coat layer, provided on at least one side of a transparent plastic film substrate, the hard coat layer having a high hardness and suppressed curling due to cracking and cure shrinkage.

It is another object of the invention to provide an antireflection hard coat film having an antireflection layer formed on the hard coat layer of the hard coat film.

It is further another object of the invention to provide an optical element using the hard coat film or the antireflection hard coat film, and it is an object of the invention to further provide an image display having the film or the optical element.

The inventors have conducted serious studies in order to solve the problems with the result that it has been found that the objects can be achieved with the following hard coat film and the like, which has led to completion of the invention.

That is, the present invention related to a hard coat film comprising a hard coat layer, which is a cured coat layer, provided on at least one side of a transparent plastic film substrate, wherein a hard coat layer forming material comprises: urethane acrylate (A); isocyanuric acid acrylate (B) and inorganic ultrafine particles (C).

The invention gives elasticity and flexibility (bendability) to a hard coat layer using urethane acrylate (A) as a hard coat layer forming material. A crosslinking degree is increased and a high hardness in a hard coat layer is realized by using isocyanuric acid acrylate (B). Moreover the invention alleviates cure shrinkage, occurring in curing of a resin which forms the hard coat layer, by using inorganic ultrafine particles (C) in use. With such a construction adopted, a hard coat film of the invention has a high hardness of pencil hardness of 3H or higher and can suppress cracking and curling with effectiveness. A hard coat film of the invention, in even in a case where the hard coat layer is made as a single layer by using a forming material containing the components (A) to (C) as well, has a high hardness and can suppress cracking and curling with effectiveness, which renders a hard coat film of the invention advantageous in regard to productivity as well.

In the above hard coat film, at least one metal oxide selected from the group consisting of titanium oxide, silicon oxide, aluminum oxide, zinc oxide, tin oxide and zirconium oxide is preferably used as the ultrafine particles (C) as the hard coat layer forming material.

In the above hard coat film, an average particle diameter of inorganic ultrafine particles (C) is preferably 100 nm or less.

In the above hard coat film, a thickness of the hard coat layer is preferably controlled in the range of from 15 to 50 μm.

In the above hard coat film, the hard coat film having a pencil hardness of 4H or higher can be obtained.

No specific limitation is placed on a thickness of a hard coat film of the invention but in a case where a thickness thereof is adjusted in the range of from 15 to 50 μm in order to obtain a hard coat layer having a high surface hardness as well, cracking or curling can be suppressed. In a case where a pencil hardness is 4H or higher as well, cracking and curling can be suppressed.

In the above hard coat film, a difference in refractive index between the transparent plastic film substrate and the hard coat layer is preferably 0.04 or less. Reflection of light on a surface can be suppressed to a low level by controlling the difference of the refractive indices so as to fall in the range.

The present invention also related to an antireflection hard coat film comprising the above hard coat film and an antireflection layer formed on the hard coat layer of the hard coat film. The antireflection hard coat film in which the antireflection layer is provided on the hard coat layer shows good antireflection effect.

In the above antireflection hard coat film, ultrafine particles of silicon oxide each in the shape of a hollow sphere are preferably contained in the antireflection layer.

The present invention further related to an optical element comprising the above hard coat film or antireflection hard coat film laminated on one side or both sides of an optical element.

The present invention further related to an image display comprising the above hard coat film according to the above antireflection hard coat film, the above optical element.

A hard coat film and an antireflection hard coat film of the invention can be preferably used in an optical element such as a polarizer or a polarizing plate and, though having a high hardness, the hard coat and the antireflection hard coat film can suppress cracking or curling, can reduce inference fringes caused by reflection and can be preferably used in a image display such as a LCD in a home television receiver, as well.

BEST MODE FOR CARRYING OUT THE INVENTION

Figure 1:
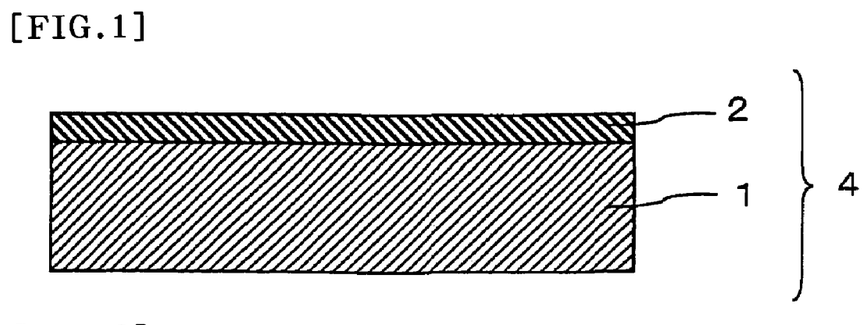
FIG. 1 is an example of a sectional view of a hard coat film of the invention.
Figure 2:
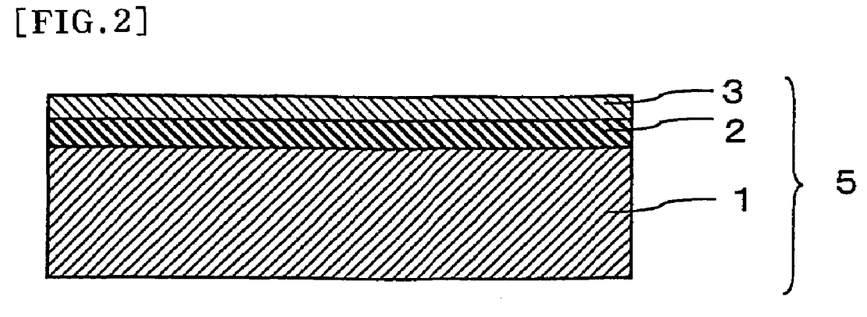
FIG. 2 is an example of a sectional view of an antireflection hard coat film of the invention.

Description will be given of a hard coat film and an antireflection hard coat film of the invention with reference to the accompanying drawings. A hard coat film 4 of the invention, as shown in FIG. 1, comprises a hard coat layer 2 on one side of a transparent plastic film substrate 1. Note that though not showing in FIG. 1, the hard coat 2 can also be provided on both sides of the transparent plastic film substrate 1. An antireflection hard coat film 5 of the invention, as shown in FIG. 2, comprises an antireflection layer 3 on a hard coat 2 of a hard coat film 4. Note that though not showing in FIG. 2, the hard coat layer 2 and the antireflection layer 3 can also be provided on both sides of the transparent plastic film substrate 1. In FIGS. 1 and 2, there is illustrated a case where the hard coat layer 2 and the antireflection layer 3, respectively, both constituted of a single layer, but the layers each may be constituted of two layers or more as far as a hard coat layer of the invention is included.

Especially, no limitation is imposed on a transparent plastic substrate film of the invention as far as the film does not deteriorate transparency. Examples of materials thereof include: polyesters such as polyethylene terephthalate, polybutylene terephthalate, and polyethylene naphthalate; polycarbonate; polyethylene; polypropylene; polystyrene, polyarylate; cyclic olefins; triacetyl cellulose; acrylic-based resin; polyvinyl chlorides; and the like. Each of the examples can be used in a stretched form thereof. Preferable among them is a stretched, especially biaxial stretched polyethylene terephthalate film in that the film is excellent in a mechanical strength and a dimensional stability. Also preferable is triacetyl cellulose in that in-plane retardation of the film is very small. A thickness of a transparent plastic film substrate is properly selected according to an applied material, but generally about in the range of 25 to 500 μm and preferably in the range of from 40 to 200 μm.

A hard coat layer forming material contains urethane acrylate (A), isocyanuric acid acrylate (B) and inorganic ultrafine particles (C).

The urethane acrylate (A) of the invention comprises components derived from (meth)acrylic acid and/or its ester, a polyol, and a diisocyanate. For example, the urethane acrylate is prepared by a process including the steps of making a hydroxy(meth)acrylate having at least one hydroxyl group from (meth)acrylic acid and/or its ester and a polyol and allowing the hydroxy(meth)acrylate to react with a diisocyanate. The term "(meth)acrylic acid" means acrylic acid and/or methacrylic acid, and "(meth)" has the same meaning with respect to the invention. Each of these components may be of a single type or a combination of two or more types.

Examples of esters of (meth)acrylic acid include alkyl (meth)acrylates such as methyl(meth)acrylate, ethyl (meth) acrylate, propyl(meth)acrylate, isopropyl(meth)acrylate, and butyl(meth)acrylate; and cycloalkyl(meth)acrylates such as cyclohexyl(meth)acrylate.

The polyol is a compound having at least two hydroxyl groups. Examples of the polyol include ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediol, 1,10-decaneglycol, 2,2,4-trimethyl-1,3-pentanediol, 3-methyl-1,5-pentanediol, neopentylglycol hydroxypivalate ester, cyclohexane dimethylol, 1,4-cyclohexanediol, spiroglycol, tricyclodecane methylol, hydrogenated bisphenol A, ethylene oxide-added bisphenol A, propylene oxide-added bisphenol A, trimethylolethane, tri(di)methylolpropane, glycerin, 3-methylpentane-1,3,5-triol, pentaerythritol, dipentaerythritol, tripentaerythritol, and glucoses.

The diisocyanate may be any type of aromatic, aliphatic or alicyclic diisocyanate. Examples of the diisocyanate include tetramethylene diisocyanate, hexamethylene diisocyanate, isophorone diisocyanate, 2,4-tolylene diisocyanate, 4,4-diphenyl diisocyanate, 1,5-naphthalene diisocyanate, 3,3-dimethyl-4,4-diphenyl diisocyanate, xylene diisocyanate, trimethyl hexamethylene diisocyanate, 4,4-diphenylmethane diisocyanate, and hydrogenated derivatives thereof.

In a hard coat layer forming material, if a proportion of urethane acrylate (A) is excessively small, flexibility and adherence of a hard coat layer obtained are low, while if excessively large, a hardness of a hard coat layer after curing tends to decrease. Hence, urethane acrylate (A) is preferably in the range of from 70 wt % to 95 wt % and more preferably in the range of from 80 to 90 wt % relative to all the resin components in a hard coat forming material {a total sum of components (A) and (B) or a total sum of the components (A) and (B) and the added resin, if a resin material is further added}.

An isocyanuric acid resin having at least one (met)acrylate group is exemplified as an isocyanuric acid acrylate (B) of the invention. For example, a compound expressed by the following chemical structure 1,

[chemical structure 1]

in which R indicates a (met)acryloyl group or —H and n indicates an integer from 1 to 5, provided that at least one of R is a (met)acryloyl group, is used. n is preferably in the range of from 1 to 5 as described above and more preferably in the range of from 2 to 3. At least one of R is a (met)acryloyl group and all of R are preferably (met)acryloyl group.

No specific limitation is placed on a mixing quantity of isocyanuric acid acrylate (B), but a mixing quantity thereof is preferably about in the range of from 5 to 25 parts by weight relative to 100 parts by weight of urethane acrylate (A). A mixing quantity thereof is more preferably about in the range of from 8 to 23 parts by weight relative to 100 parts by weight of urethane acrylate (A). If a mixing quantity of isocyanuric acid acrylate (B) exceeds 25 parts by weight, flexibility is unpreferably poor. If a mixing quantity thereof is less than 5 parts by weight, no sufficient hardness is unpreferably obtained.

The inorganic ultrafine particles(C) is exemplified as titanium oxide, silicon oxide, aluminum oxide, zinc oxide, tin oxide, zirconium oxide, calcium oxide, indium oxide, antimony oxide. The composite of these can be used. Among them, titanium oxide, silicon oxide (silica), aluminum oxide, zinc oxide, tin oxide, zirconium oxide is preferable. The inorganic ultrafine particles(C) can be used either alone or in a mixture of two kinds thereof.

An average particle diameter of inorganic ultrafine particles (C) is preferably 100 nm or less. If an average diameter exceeds 100 nm, light scattering occurs to thereby reduce a transmittance of a hard coat layer or color the layer, which is unpreferable in regard to transparency. An average particle diameter of inorganic ultrafine particles (C) is preferably 50 nm or less and more preferably 30 nm or less.

A mixing quantity of inorganic ultrafine particles (C) is preferably about in the range of from 10 to 60 parts by weight relative to all the resin components in a hard coat forming material. A mixing quantity of inorganic ultrafine particles (C) is more preferably about in the range of from 30 to 45 parts by weight relative to all the resin components in a hard coat forming material. If a mixing quantity of inorganic ultrafine particle (C) exceeds 60 wt % relative to all the resin components of a hard coat forming material, cohesion of the ultrafine particles is easy to occur, resulting in a fault similar to that as described above. Coatability is also unpreferably deteriorated. On the other hand, if a mixing quantity thereof is less than 10 wt %, curling unpreferably tends to increase.

Inorganic ultrafine particles (C) have a function to adjust an apparent refractive index of a hard coat layer depending on a mixing quantity. It is preferable that a refractive index of a transparent plastic film substrate and a refractive index of a hard coat layer approximates to each other. Hence, it is preferably to properly adjust a mixing quantity of inorganic ultrafine particles (C) so as reduce a difference (d) in refractive index between the transparent plastic film substrate and the hard coat layer for preparing a hard coat layer forming material. If the refractive index difference (d) is larger, a phenomenon occurs that is called as interference fringes showing hues of a rainbow caused by a reflected light of external light striking the hard coat film, resulting in degradation of display quality. In an office where, especially, an image display with a hard coat film is used with a high frequency, three wavelength fluorescent lamps have been increasingly used very much as a fluorescent lamp. A three wavelength fluorescent lamps has a feature that an intensity of a light emission with a specific wavelength is high to thereby render an object to be seen clearly, but it has been understood that interference fringes appear more conspicuously under illumination of the three wavelength fluorescent lamps.

A refractive index difference (d) is preferably 0.04 or less. A refractive index difference (d) is more preferably 0.02 or less. For example, in a case where a polyethylene terephthalate film is used as a transparent plastic film substrate, titanium oxide is used as a material of inorganic ultrafine particles (C) in a hard coat forming material in an example and a mixing quantity thereof is of about 35% relative to all the resin components in a hard coat forming material, thereby enabling a refractive index difference (d) from a refractive index of about 1.64 of a polyethylene terephthalate film to be adjusted 0.04 or less and again thereby enabling occurrence of interference fringes to be suppressed. In a case where triacetyl cellulose film is used as a transparent plastic film substrate, silicon oxide is used as a material of inorganic ultrafine particles (C) in a hard coat forming material in an example, and a mixing quantity thereof is of about 40% relative to all the resin components in the hard coat forming material, thereby enabling a refractive index difference (d) from a refractive index of about 1.48 of a triacetyl cellulose film to be adjusted 0.02 or less similar to that as described above and again thereby enabling occurrence of interference fringes to be suppressed.

A hard coat forming material can further contain a reactive diluent in addition to the components (A) to (C). A reactive diluent is part of resin components. Examples of the reactive diluent include: bifunctional or higher functional monomer or oligomer such as 1,6-hexanediol di(met)acrylate, tripropylene glycol di(met)acrylate, diethylene glycol di(met)acrylate, hexanediol di(met)acrylate, pentaerythritol tetra(met)acrylate, trimethylolpopane tri(met)acrylate, dipentaerythritol hexa(met)acrylate, neopentyl glycol di(met)acrylate and the like. Examples thereof used further include: acrylic acid esters such as N-vinyl pyrrolidone, ethyl acrylate and propyl acrylate; metacrylic acid esters such as ethylmetacrylate, propyl metacrylate, isopropyl metacrylate, butyl metacrylate, hexyl metacrylate, isooctyl metacrylate, 2-hydroxyethyl metacrylate, cyclohexyl metacrylate and nonylphenyl metacrylate; derivatives such as tetrahydrofurfryl metacrylate, and modified caprolactone; and unifunctional monomers such as styrene; a-methylstyrene; acrylic acid and a mixture thereof. A reactive diluent described above is preferably used at 15 parts by weight or less and preferably at 10 parts by weight or less relative to 100 parts by weight of urethane acrylate (A).

Curing of a hard coat forming material can be effected by thermal curing, or ionization radiation curing such as ultraviolet curing and various kinds of polymerization initiators can be used so as to be adapted for curing means. A conventional known photopolymerization initiator can be used in a case where an ultraviolet is used as curing means. Examples thereof include:

bezoins and alkyl ethers thereof such as benzoin, benzoin methyl ether, benzoin ethyl ether, benzoin isopropyl ether, N,N,N,N-tetramethyl-4,4'-diaminobenzophenone, benzyl methyl ketal; acetophenones such as, acetophenone, 3-methylacetophenone, 4-chlorobenzophenone, 4,4'-dimethoxybenzophenone, 2,2-dimethoxy-2-phenyl acetophenone and 1-hydroxycyclohexyl phenyl ketone; anthraquinones such as methyl anthraquinone, 2-ethyl anthraquinone and 2-amyl anthraquinone; xanthae; thioxanthanes such as thioxanthane, 2,4-diethyl thioxanthane, 2,4-diisopropyl thioxanthane, ketals such as acetophenone dimethyl ketal and benzyl dimethyl ketal; benzophenones such as benzophenone and 4,4-bismethylaminobenzophenone; and others such as 1-(4-isopropylphenyl)-2-hydroxy-2-methyl propane-1-one. Those can be used either alone or a mixture of two kinds or more. A quantity of use of a photopolymerization initiator is preferably about 5 parts by weight or less and more preferably in the range of 1 to 4 parts by weight relative to all the resin components in a hard coat forming material {the total sum of the component (A) and the component (B)}.

Various kinds of leveling agents can be added into a hard coat forming material. A fluorine-based or silicone-based leveling agent is preferably properly selected for use. More preferable is a silicone-based leveling agent. Examples of the silicone-based leveling agent include: polydimethylsiloxane, polyether-modified polydimethylsiloxane, polymethylalkylsiloxane and others. A mixing quantity of a fluorine-based or silicone-based leveling agent is preferably 5 parts by weight or less and more preferably in the range of from 0.01 to 5 parts by weight relative to 100 parts by weight of a resin.

In a case where ultraviolet light is used to cure the hard coat layer forming material, the leveling agent in the hard coat layer forming material can bleed to the air interface during the steps of pre-drying and drying off the solvent so that the effect of inhibiting curing of UV-curable resin by oxygen can be blocked and that a hard coat layer having sufficient hardness even at the uppermost surface can be obtained. The silicone leveling agent can also bleed to the surface of the hard coat layer to provide lubricity and thus can increase scratch resistance.

If necessary, the hard coat layer forming material may contain a pigment, a filler, a dispersing agent, a plasticizer, a ultraviolet absorbing agent, a surfactant, an antioxidant, a thixotropy-imparting agent, or the like, as long as the performance is not degraded. One of these additives may be used alone, or two or more of these additives may be used together.

A hard coat film of the invention can be fabricated by forming a hard coat layer, on at least one side of a transparent plastic film substrate, which is a cured coat layer obtained by curing an uncured coat after coating the hard coat forming material. A hard coat forming material, in coating, can be coated as a solution obtained by dissolving the hard coat forming material into a solvent. In a case where a hard coat forming material is coated as a solution, the wet coat is dried, followed by curing.

Examples of the solvent include: ketones such as acetone, methyl ethyl ketone, methyl isobutyl ketone, cyclopentanone and cyclohexanone; esters such as ethyl acetate and butyl acetate;

alcohols such as isopropyl alcohol and ethyl alcohol; aromatic hydrocarbons such as benzene, toluene, xylene, methoxybenzene and 1,2-dimethoxybenzene; phenols such as phenol and parachlorophenol; halogenated hydrocarbons such as chloroform, dichloromethane, dichloroethane, tetrachloroethane, trichloroethylene, tetrachloroethylene and chlorobenzene. The solvents can be used either alone or in a mixture of two kinds thereof. A solid matter concentration in the solution is usually preferably 70 wt % or less and more preferably in the range of from 30 to 60 wt %.

The hard coat layer forming material may be applied to the film substrate by any conventional coating method such as fountain coating, die coating, spin coating, spray coating, gravure coating, roll coating, and bar coating.

While the hard coat layer forming material may be cured by any method, ionizing radiation curing is preferably used. While any type of activation energy may be used for such curing, ultraviolet light is preferably used. Preferred examples of the energy radiation source include high-pressure mercury lamps, halogen lamps, xenon lamps, metal halide lamps, nitrogen lasers, electron beam accelerators, and radioactive elements. The amount of irradiation with the energy radiation source is preferably from 50 to 5000 mJ/cm$^2$ in terms of accumulative exposure at an ultraviolet wavelength of 365 nm. If the amount of irradiation is less than 50 mJ/cm$^2$, curing can be insufficient so that the hardness of the hard coat layer can be degraded in some cases. Beyond 5000 mJ/cm$^2$, the hard coat layer can be colored and have reduced transparency in some cases.

No specific limitation is placed on a thickness of a hard coat layer, which is a cured coat layer obtained by curing the hard coat forming material, but a thickness thereof is preferably in the range of from 15 to 50 μm as described above. A thickness of the hard coat layer is more preferably in the range of from 20 to 45 μm. If a thickness of the hard coat layer is thinner than 15 μm, a hardness thereof is easy to be reduced, while if a thickness thereof is thicker than 50 μm, an adverse possibility arises that cracking occurs in the hard coat layer itself or a hard coat film is curled on a hard coat surface due to cure shrinkage of the hard coat.

An antireflection layer may be formed on the hard coat layer to form an antireflection hard coat film. Light incident on an object undergoes reflection on the interface, absorption and scattering in the interior and any other phenomena until it goes through the object and reaches the back side. Light reflection at the interface between air and a hard coat layer is one of the factors in the reduction in visibility of the image on a display equipped with the hard coat film. The antireflection layer reduces such surface reflection.

The antireflection layer may be a thin optical film that is stacked on the surface of the hard coat layer so as to have strictly controlled thickness and refractive index. In this technique, the antireflection function is produced by allowing opposite phases of incident light and reflected light to cancel each other out based on interference of light.

When the antireflection layer is designed based on interference of light, the interference effect can be enhanced by a method of increasing the difference between the refractive indices of the antireflection layer and the hard coat layer. A laminate of two to five thin optical films (each with strictly controlled thickness and refractive index) may be stacked on a substrate to form an antireflection multilayer. In such a case, components of different refractive indices are generally used to form a plurality of layers with a certain thickness. Thus, the antireflection layer can be optically designed at a higher degree of freedom, the antireflection effect can be enhanced, and it may be possible to make the spectral reflection characteristics flat in the visible light range. Since each layer of the thin optical film is required to be precise in thickness, a dry process such as vacuum deposition, sputtering, and CVD is generally used to form each layer.

The hard coat layer forming material may use titanium oxide, zirconium oxide, silicon oxide, magnesium fluoride, or the like. In order to produce a more significant antireflection function, a laminate of a titanium oxide layer(s) and a silicon oxide layer(s) is preferably used. Such a laminate is preferably a two-layer laminate comprising a high-refractive-index titanium oxide layer (refractive index: about 1.8), which is formed on the hard coat layer, and a low-refractive-index silicon oxide layer (refractive index: about 1.45), which is formed on the titanium oxide layer. Also preferred is a four-layer laminate comprising the two-layer laminate and a titanium oxide layer and a silicon oxide layer formed in this order on the two-layer laminate. The antireflection layer of such a two- or four-layer laminate can evenly reduce reflection over the visible light wavelength range (380 to 780 nm).

The antireflection effect can also be produced by stacking a thin monolayer optical film on the hard coat layer substrate. In the design of a single antireflection layer, the difference between the refractive indices of the antireflection layer and the hard coat layer should be large for the maximum antireflection function. Concerning the thickness (d) of the antireflection layer, the refractive index (n) and the wavelength (λ) of incident light, the relation nd=λ/4 is established. If the antireflection layer is a low-refractive-index layer having a refractive index lower than that of the substrate, its reflectance can be minimum under the conditions that the relation should be established. For example, if the refractive index of the antireflection layer is 1.45, the antireflection layer with a thickness of 95 nm can have a minimum reflectance at a wavelength of 550 nm with respect to an incident beam of visible light.

The antireflection function should be produced in the visible light wavelength range of 380 to 780 nm, and the visibility is particularly high in the wavelength range of 450 to 650 nm. The layer is generally designed to have a minimum reflectance at the center wavelength 550 nm of the range.

In the design of a single antireflection layer, its thickness accuracy may be less strict than that of the antireflection multilayer and may be in the range of the design thickness ±10%. In a case where the design thickness is 95 nm, for example, the layer with a thickness in the range of 86 nm to 105 nm can be used without problems. Thus, a single antireflection layer is generally formed using a wet process such as fountain coating, die coating, spin coating, spray coating, gravure coating, roll coating, and bar coating.

Examples of the material for forming a single antireflection layer include resin materials such as UV-curable acrylic resins; hybrid materials such as a dispersion of inorganic fine particles (such as colloidal silica) in a resin; and sol-gel materials using metal alkoxide such as tetraethoxysilane and titanium tetraethoxide. Any of these materials may be used together with a fluoro-compound for imparting anti-fouling surface properties. In terms of scratch resistance, low-refractive-index layer materials with a high content of an inorganic component tend to provide good performance, and sol-gel materials are particularly preferred. Partial condensates of sol-gel materials may be used.

The sol-gel materials having a fluoro-group include perfluoroalkylalkoxysilane. A compound represented by the general formula: $CF_3(CF_2)_nCH_2CH_2Si(OR)_3$, wherein R represents an alkyl group of 1 to 5 carbon atoms, and n represents an integer of 0 to 12, is exemplified as perfluoroalkylalkoxysilane. Specific examples include trifluoropropyltrimethoxysilane, trifluoropropyltriethoxysilane, tridecafluorooctyltrimethoxysilane, tridecafluorooctyltriethoxysilane, heptadecafluorodecyltrimethoxysilane, and heptadecafluorodecyltriethoxysilane. In particular, the compounds whose n is from 2 to 6 are preferred.

In the present invention, ultrafine particles used as the material for forming the antireflection layer, hollow spherical silicon oxide ultrafine particles are preferably used. The hollow spherical silicon oxide ultrafine particles preferably have an average particle size of 5 to 300 nm. Such ultrafine particles are like hollow spheres each comprising a pore-containing outer shell in which a hollow is formed. The hollow may contain a solvent and/or a gas which are left after the fine particles are prepared. A precursor substance for forming the hollow is preferably left in the hollow. The thickness of the outer shell is preferably in the range of about 1 to about 50 nm and in the range of 1/50 to 1/5 of the average particle size. The outer shell preferably comprises a plurality of coating layers. The pore is preferably blocked, and the hollow is preferably sealed with the outer shell. The antireflection layer holding a porous structure or a hollow can have a reduced refractive index and thus is preferably used.

The hollow spherical silicon oxide ultrafine particles should have an average particle size of about in the range of 5 to 300 nm. If the average particle size is less than 5 nm, the volume fraction of the outer shell in the spherical fine particles can be higher and thus the volume fraction of the hollow can be lower. If the average particle size is more than 300 nm, it may be difficult to prepare a stable dispersion, and the ultrafine particle-containing antireflection layer can tend to have reduced transparency. The hollow spherical silicon oxide ultrafine particles preferably have an average particle size in the range of 10 to 200 nm. The average particle size may be determined by dynamic light scattering.

For example, a method of producing hollow spherical silicon oxide ultrafine particles includes the steps (a) to (c) as described below. The hollow spherical silicon oxide ultrafine particles may be prepared in the form of a dispersion. For example, the method of producing such hollow spherical silicon oxide ultrafine particles is preferably a method of producing silica fine particles as disclosed in JP-A No. 2000-233611. Specifically, the method includes the step of:

(a) simultaneously adding an aqueous silicate solution and/or an acidic silicic acid solution and an aqueous solution of an alkali-soluble inorganic compound to an aqueous alkali solution with a pH of 10 or more or an aqueous alkali solution with a pH of 10 or more in which seed particles are optionally dispersed, in order to form a dispersion of core particles with a $MO_x/SiO_2$ molar ratio of 0.3 to 1.0, wherein $SiO_2$ represents silicon oxide, and $MO_x$ represents inorganic compounds other than silicon oxide;

(b) adding a source of silicon oxide to the dispersion of core particles to form a first silicon oxide coating layer on the core particles; and (c) adding an acid to the dispersion so as to partially or entirely remove an element constituting the core particles.

A dispersion of the hollow spherical silicon oxide ultrafine particles may be mixed with any type of matrix component to form an antireflection coating liquid. The term "any type of matrix component" refers to any component capable of forming a coating film on the surface of the hard coat layer. The matrix may be selected and used from resins and the like satisfying the requirements for adhesion to the substrate, hardness, coating properties, and the like. Examples of such a matrix include conventional organic resins such as polyester resins, acrylic resins, urethane resins, vinyl chloride resins, epoxy resins, melamine resins, fluororesins, silicone resins, butyral resins, phenol resins, vinyl acetate resins, UV-curable resins, electron beam-curable resins, emulsion resins, water-soluble resins, hydrophilic resins, any mixtures thereof, any copolymers thereof, and any modifications thereof. The hydrolyzable organic silicon compounds as illustrated for the single antireflection layer may also be used as the matrix component.

When the organic resin is used as the matrix component, for example, the matrix and an organic solvent dispersion of hollow spherical silicon oxide ultrafine particles, which uses an organic solvent such as an alcohol in place of water as a dispersion medium, or the matrix and an organic solvent dispersion of the ultrafine particles which has been optionally treated with any conventional coupling agent are diluted with any appropriate organic solvent to form an antireflection coating liquid.

When the hydrolyzable organic silicon compound is used as the matrix component, for example, water and a catalyst of an acid or alkali are added to a liquid mixture of an alkoxysilane and an alcohol to form a partially hydrolyzed product of the alkoxysilane, which is then mixed with the above-mentioned dispersion and optionally diluted with an organic solvent to form a coating liquid.

In the coating liquid, the weight ratio of the silicon oxide ultrafine particles to the matrix component is preferably in the range of 1:99 to 9:1. If the weight ratio exceeds 9:1, the antireflection layer can be insufficient in strength and impractical in some cases. If the weight ratio is less than 1:99, the addition of the silicon oxide ultrafine particles cannot be so effective in some cases.

The refractive index of the antireflection layer formed on the surface of the hard coat layer may be as low as from 1.2 to 1.42 depending on the mixture ratio between the silicon oxide ultrafine particles and the matrix component or the like and the refractive index of the matrix used. The refractive index of the silicon oxide ultrafine particles themselves may be from 1.2 to 1.38 in the invention.

The antireflection hard coat film comprising the antireflection layer formed on the hard coat layer of the hard coat film is preferred in terms of pencil hardness. The surface of the hard coat layer containing ultrafine particle(C) has fine irregularities, which may have an effect on pencil drawing (the pencil can tend to scratch the surface, and the force can tend to be exerted). If the antireflection layer is provided, the irregularities can be smoothed out, and the pencil hardness of the hard coat layer can be increased from a usual value (such as about 3H) to 4H.

The antireflection layer may be more frequently attached to the uppermost surface of image displays and thus tends to receive stains from the external environment. Particularly, general stains such as fingerprint, thumbmark, sweat, and hair dressing are frequently left. The stain deposit can change the surface reflectance or stand out whitely to make the displayed content unclear. Such stains can be more noticeable on the layer than on a simple transparent plate or the like. In such a case, a fluoro-silane compound, a fluoro-organic compound or the like may be layered on the antireflection layer in order to impart the function of anti-deposition or easy elimination.

In fabrication of a hard coat film and an antireflection hard coat film, adherence can be improved between a transparent plastic film substrate and a hard coat layer, and between a hard coat layer and an antireflection layer by applying various kinds of surface treatments to the transparent plastic film substrate and the hard coat layer. The surface treatment may be low-pressure plasma treatment, ultraviolet radiation treatment, corona treatment, flame treatment, or acid or alkali treatment. When triacetyl cellulose is used for the film substrate, alkali saponification treatment as specifically described below is preferably used. The surface of the cellulose ester film is preferably subjected to cycles of immersing in an alkali solution and then washing with water and drying. The alkali solution may be a potassium hydroxide solution or a sodium hydroxide solution, and the normal concentration of the hydroxide ion is preferably from 0.1 N to 3.0 N, more preferably from 0.5 N to 2.0 N. The temperature of the alkali solution is preferably in the range of 25° C. to 90° C., more preferably of 40° C. to 70° C. Thereafter, washing with water and drying are performed so that surface-treated triacetyl cellulose can be obtained.

A hard coat film and an antireflection hard coat film can be used usually by adhering a transparent plastic film substrate side thereof to surfaces of CRT, LCD, PDP and ELD with a pressure sensitive adhesive or an adhesive interposed therebetween.

The film substrate side of the hard coat film or the antireflection hard coat film is generally adhered to an optical element for use in a LCD or ELD via a pressure-sensitive adhesive or an adhesive. Before the adhering, the transparent plastic film substrate may also be subjected to the surface treatment as described above.

For example, the optical element is a polarizer or a polarizing plate. A polarizing plate comprising a polarizer and a transparent protective film formed on one or both sides of the polarizer is commonly used. If the transparent protective film is formed on both sides of the polarizer, the front and rear transparent protective films may be made of the same material or different materials. Polarizing plates are generally placed on both sides of a liquid crystal cell. Polarizing plates may be arranged such that the absorption axes of two polarizing plates are substantially perpendicular to each other.

The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

The polarizer is usually as a polarizing plate in which a transparent protective film is formed on one or both sides of the polarizer. The transparent protective preferably has good transparency, mechanical strength, thermal stability, moisture-blocking properties, isotropy, or the like. Examples of the material for the transparent protective film exemplifies a film comprising a transparent resin include polyester resins such as polyethylene terephthalate and polyethylene naphthalate; cellulose resins such as diacetyl cellulose and triacetyl cellulose; acrylic resins such as poly(methyl methacrylate); styrene-based resins such as polystyrene, acrylonitrile-styrene copolymers, styrene resins, acrylonitrile-styrene resins, acrylonitrile-butadiene-styrene resins, acrylonitrile-ethylene-styrene resins, styrene-maleimide copolymers, and styrene-maleic anhydride copolymers; or polycarbonate resins. The transparent protective film may be exemplifies a film comprising a transparent resin include a olefin resin such as polyethylene, polypropylene, cyclo or norbornene structure containing polyolefin resin, an ethylene-propylene copolymer; a vinyl chloride resin, or an amide resin such as nylon and aromatic polyamide. The transparent protective film may be exemplifies a film comprising a transparent resin include an imide resin such as aromatic polyimide and polyimide amide, a sulfone resin, a polyethersulfone resin, a polyetheretherketone resin, a polyphenylene sulfide rein, a vinyl alcohol resin, a vinylidene chloride resin, a vinyl butyral resin, an arylate resin, a polyoxymethylene resin, an epoxy resin, or any blend of the above resins.

Moreover, as is described in Japanese Patent Laid-Open Publication No. 2001-343529 (WO 01/37007), polymer films, for example, resin compositions including (A) thermoplastic resins having substituted and/or non-substituted imide group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. These films exhibit small retardations and small photoelastic coefficients and thus can eliminate defects such as unevenness due to distortion when used in a protective film for a polarizing plate or the like. These films also have low moisture permeability and thus have high durability against moistening.

In terms of polarizing properties, durability and the like, cellulose resins such as triacetyl cellulose and norbornene resins are preferably used for the transparent protective film. Specific examples of such resins include FUJITAC (trade name) manufactured by Fuji Photo Film Co., Ltd., ZEONOA (trade name) manufactured by Nippon Zeon Co., Ltd. and ARTON (trade name) manufactured by JSR Corporation.

A thickness of the transparent protective film is determined appropriately, and in general, it is about in the range of 1 to 500 µm so that it may have suitable thinness, or in viewpoint of workability, such as strength and handling property. Especially it is preferably 5 to 200 µm, and more preferably 10 to 150 µm. In the above range, the transparent protective film can mechanically protect a polarizer and can prevent a polarizer from shrinking and retain stable optical properties even when exposed to high temperature and high humidity.

It is preferred that the degree of the coloration of the transparent substrate film is as little as possible. Accordingly, it is preferred to use a protective film wherein a retardation value in the film thickness direction, which is represented by $Rth = (nx-nz) \cdot d$ wherein nx represent refractive indices of the film of the slow axis direction in its plane, nz represents a refractive index of the film in the thickness direction thereof, and d represents a thickness of the film, is from −90 to +75 nm. The use of the film wherein the retardation value (Rth) in the thickness direction is from −90 nm to +75 nm makes it possible to overcome substantially the coloration (optical coloration) of the polarizing plate, resulting from the protective film. The retardation value (Rth) in the thickness direction is more preferably from −80 nm to +60 nm, more preferably from −70 nm to +45 nm.

The in-plane retardation value of the transparent protective film and the retardation value in the thickness direction of the transparent protective film can affect the viewing angle properties of liquid crystal displays. Thus, it is preferable to use a transparent protective film with an optimized retardation value. It should be noted that the transparent protective film stacked on a polarizer surface close to a liquid crystal cell should have an optimized retardation value, while that stacked on a polarizer surface far away from the liquid crystal cell does not affect the optical properties of the liquid crystal display and thus does not need to have an optimized retardation value.

The transparent protective film stacked on a polarizer surface close to a liquid crystal cell preferably has an in-plane retardation value (Re: (nx−ny)·d) of 0 to 5 nm, more preferably of 0 to 3 nm, still more preferably of 0 to 1 nm. Its retardation value in its thickness direction (Rth) is preferably from 0 to 15 nm, more preferably from 0 to 12 nm, still more preferably from 0 to 10 nm, particularly preferably from 0 to 5 nm, most preferably from 0 to 3 nm.

The polarizing plate in which the hard coat film or the like is stacked may be a laminate of the hard coat film or the like, the transparent protective film, the polarizer, and the transparent protective film in this order or a laminate of the hard coat film or the like, the polarizer and the transparent protective film in this order.

In addition, the transparent protective film surface to which the polarizer is not adhered may be provided with a hard coat layer or subjected to anti-sticking treatment. The hard-coating treatment is performed in order to prevent scratching of the polarizing plate surface. In the process of forming the hard coat layer, for example, a cured film with high hardness, good sliding characteristics and the like may be formed on the surface of the transparent protective film by using an appropriate UV-curable resin such as an acrylic resin and a silicone resin. The anti-sticking treatment is performed in order to prevent adhesion to the adjacent layer. The hard coat layer, the anti-sticking layer or the like may be formed as being the transparent protective film itself or may be provided as an independent optical layer separately from the transparent protective film.

A hard coat layer, a primer layer, an adhesive layer, a pressure-sensitive adhesive layer, an antistatic layer, an electrically-conductive layer, a gas barrier layer, a water vapor-blocking layer, a moisture-blocking layer, or the like may also be placed between the layers of a polarizing plate or on the surface of a polarizing plate. At the stage of forming each layer of the polarizing plate, electrically-conductive particles, an antistatic agent, various types of fine particles, a plasticizer, or the like may also be added to or mixed with the material for each layer to modify it as needed.

Any method may be used to laminate the transparent protective film and the polarizer. For example, the protective film and the polarizer may be laminated through an adhesive comprising an acrylic polymer or a vinyl alcohol polymer or an adhesive comprising at least a water-soluble crosslinking agent for a vinyl alcohol polymer, such as boric acid, borax, glutaraldehyde, melamine, and oxalic acid, so that the resulting protective layer can be resistant to peeling due to humidity or heat and can have high light transmittance or high degree of polarization. A polyvinyl alcohol adhesive is preferably used because of its good adhesion to the polarizer material, polyvinyl alcohol.

Pressure-sensitive adhesives that have high transparency and low birefringence and can exhibit sufficient adhesive strength in the form of a thin layer are preferably used to laminate the polarizer and the transparent protective film of the norbornene resin-containing polymer film. Such a pressure-sensitive adhesive may be a dry laminating adhesive using a mixture of a polyurethane resin solution and a polyisocyanate resin solution, a styrene-butadiene rubber adhesive, or a two-part curable epoxy adhesive such as two components of an epoxy resin and polythiol and two components of an epoxy resin and polyamide. In particular, solvent type adhesives or two-part curable epoxy adhesives are preferred, and transparent adhesives are preferred. The adhesive force can be improved using an appropriate adhesive primer depending on the type of adhesives, and in the case of using such an adhesive; a certain adhesive primer is preferably used.

Any adhesive primer may be used as long as its layer can improve the adhesion properties. For example, the adhesive primer may be a so-called coupling agent such as a silane coupling agent having a hydrolyzable alkoxysilyl group and a reactive functional group such as amino, vinyl, epoxy, mercapto, and chloro in the same molecule, a titanate coupling agent having an organic functional group and a titanium-containing hydrolyzable hydrophilic group in the same molecule, and an aluminate coupling agent having an organic functional group and an aluminum-containing hydrolyzable hydrophilic group in the same molecule; or a resin having an organic reactive group, such as an epoxy resin, an isocyanate resin, a urethane resin, and an ester urethane resin. In particular, the silane coupling agent-containing layer is preferred, because it is easy to handle industrially.

An optical element is used as an optical film in which the polarizing plate is laminated with an additional optical element (optical layer) in a practical use. No specific limitation is placed on an additional optical layer, and there can be used one optical layer, or two optical layers or more that is used in formation of a liquid crystal display or the like such as a retardation plate (including ½ or ¼ wavelength plate). Especially preferable is a polarizing plate obtained by further laminating a brightness enhancement film on a polarizing plate. In particular, a reflection type polarizing plate or a transflective type polarizing plate in which a reflection plate or a transfiective reflection plate is further laminated on a polarizing plate, an elliptically polarizing plate or a circular polarizing plate in which a retardation plate is laminated on a polarizing plate, a wide viewing angle polarizing plate in which a viewing angle compensation film is further laminated on a polarizing plate, or a polarizing plate in which a brightness enhancement film is further laminated on a polarizing plate is preferable. When it is used the elliptically polarizing plate, or the polarizing plate having optical compensation, the hard coat film is formed in the side of the polarizing plate.

Furthermore, if needed, there may also be given treatments for giving various characteristics, various functions, etc., such as scratch-proof property, durability, weatherability, wet heat resistance, heat resistance, moisture resistance, water vapor permeability, antistatic property, conductivity, improvement in adhesion between layers, and improvement in mechanical strength, or insertion, lamination of functional layers, etc.

A reflection-type polarizing plate is a plate in which a reflection layer is provided on a polarizing plate, is for forming a liquid crystal display which is a type of reflecting and displaying incident light from a visible side (display side), and has an advantage that building-in of a light source such as back light can be omitted, and a liquid crystal display is easily thinned. Formation of a reflection-type polarizing plate can be performed by an appropriate format such as a format of providing a reflection layer comprising a metal on one side of a polarizing plate via a transparent protecting layer, if necessary.

As an example of a reflective type polarizing plate, a plate may be mentioned on which, if required, a reflective layer is formed using a method of attaching a foil and vapor deposition film of high-reflectance metals, such as aluminum, to one side of a matte treated protective film.

A reflection plate may be used by a reflection sheet on which a reflection layer is provided on an appropriate film like a transparent protecting film in place of a format of directly imparting to the transparent film of a polarizing plate. Since a reflection layer is usually made of a metal, a use aspect in the state where its reflection side is covered with a transparent protecting film or a polarizing plate is more preferable from a viewpoint of prevention of reduction in a reflectivity due to oxidation, consequently long term durability of an initial reflectivity, and avoidance of separate provision of a protecting layer.

A transflective polarizing plate can be obtained by adopting a transflective type reflection layer such as a half mirror which reflects light on a reflection layer and permeates light in the aforementioned plate. The transflective polarizing plate is usually provided on a back side of a liquid crystal cell, and such a type of a liquid crystal display can be formed that, when a liquid crystal display is used in the relatively light atmosphere, incident light from a visible side (display side) is reflected to display an image and, in the relatively dark atmosphere, an image is displayed using a built-in light source such as back light built in a back side of a transflective polarizing plate. That is, the transflective polarizing plate is useful for forming such a type of a liquid crystal display that energy which is used in a light source such as back light can be saved, and the device can be used using a built-in light source also under the relatively dark atmosphere.

An elliptically polarizing plate or a circular plate in which a retardation plate is further laminated on a polarizing plate will be explained. When a linearly polarized light is changed to elliptically polarized light or a circularly polarized light, or elliptically polarized light or circularly polarized light is changed to linearly polarized light, or a polarization direction of linearly polarized light is changed, a retardation plate is used. In particular, as a retardation plate for changing linearly polarized light to circularly polarized light, or changing circularly polarized light to linearly polarized light, a so-called ¼ wavelength plate (also referred to as λ/4 plate) is used. A ½ wavelength plate (also referred to as λ/2 plate) is usually used when a polarization direction of linearly polarized light is changed.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflective type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, polyvinyl alcohols, polystyrenes, poly methyl methacrylates, polypropylene or the other polyolefin; polyarylates and polyamides; oriented films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of viewing angle, etc., and may be a retardation plate in which two or more sorts of retardation plates is laminated so that optical properties, such as retardation, may be controlled.

The aforementioned elliptically polarizing plate or reflection-type elliptically polarizing plate is such that an appropriate combination of a polarizing plate or a reflection-type polarizing plate and a retardation plate is laminated. Such the elliptically polarization plate can be formed by successively and separately laminating a (reflection-type) polarizing plate and a retardation plate in a process for manufacturing a liquid crystal display so that a combination of the (reflection-type) polarizing plate and the retardation plate is obtained, and an optical film such as an elliptically polarizing plate which has been formed in advance as described above has an advantage that it is excellent in stability of quality and laminating workability, and an efficiency of manufacturing a liquid crystal display can be improved.

A viewing angle compensation film is a film for extending a viewing angle so that an image is seen relatively clearly even when a screen of a liquid crystal display is seen not from a direction vertical to the screen but from a slightly oblique direction. Such the viewing angle compensating retardation plate is such that an orientation layer of a liquid crystal polymer is supported on a retardation plate, an oriented film such as a liquid crystal polymer, or a transparent substrate. In a normal retardation plate, a polymer film having birefringence which has been uniaxially stretched in its in-plane direction is used, while in a retardation plate used as a viewing angle compensation film, a bidirectional stretched film such as a polymer film having birefringence which has been biaxially stretched in-plane direction, a polymer having birefringence which has been uniaxially stretched in-plane direction, is also stretched, and also stretched in a thickness direction, and has a controlled refractive index in a thickness direction, and a tilt oriented film is used. Examples of the tilt oriented film include a film obtained by adhering a thermally shrinking film to a polymer film, and subjecting the polymer film to stretching treatment or/and shrinking treatment under action of a shrinking force due to heating, and a film in which a liquid crystal polymer is tilt oriented. As a raw material polymer for a retardation plate, the same polymer as that explained for the previous retardation plate is used, and an appropriate polymer for the purpose of preventing coloration due to change in a visual confirmation angle based on a retardation due to a liquid crystal cell, or extending a viewing angle for better visual confirmation can be used.

In addition, from a viewpoint of accomplishment of a wide viewing angle for better visual confirmation, an optical compensation retardation plate in which an optically anisotropic layer comprising an oriented layer of a liquid crystal polymer, in particular, a tilt oriented layer of a discotic liquid crystal polymer is supported by a triacetylcellulose film can be preferably used.

A polarizing plate in which a polarizing plate and a brightness enhancement film are laminated is usually used by provision on a back side of a liquid crystal cell. The brightness enhancement film exhibits such the property that, when natural light is introduced by back light of a liquid crystal display, or reflection from a back side, linearly polarized light having a prescribed polarization axis or circularly polarized light in a prescribed direction is reflected, and other light is permeated.

In a polarizing plate in which the brightness enhancement film is laminated on a polarizing plate, light from a light source such as back light is introduced to obtain permeated light in the prescribed polarized state and, at the same time, light other than the aforementioned prescribed polarized state is reflected without permeation. Light reflected on a surface of this brightness enhancement film is inverted via a reflection layer provided on its rear side to introduce into the brightness enhancement film again, a part or all of this is permeated as light in the prescribed polarized state to increase an amount of light permeating through the brightness enhancement film and, at the same time, polarized light which is absorbed in a polarizer with difficulty is supplied to increase an amount of light which can be utilized in a liquid crystal display image display, thereby, a luminance can be improved. That is, when light is introduced through a polarizer from a back side of a liquid crystal cell by back light without using the brightness enhancement film, most of light having a polarization direction which is not consistent with a polarization axis of a polarizer is absorbed in a polarizer, and is not permeated through a polarizer. That is, different depending on property of a used polarizer, about 50% of light is absorbed in a polarizer, an amount of light which can be utilized in a liquid crystal image display is reduced by that portion, and an image is darkened. Since the brightness enhancement film does not introduce light having such a polarization direction that it is absorbed in a polarizer, into a polarizer, once reflects on the brightness enhancement film, and inverts the light via a reflection layer provided on its rear side to introduce into the brightness enhancement film again, these are repeated, and the brightness enhancement film makes only polarized light that a polarization direction of light reflecting and inverting between both of them becomes a polarization direction capable of permeating through a polarizer, permeate therethrough, supplies this to a polarizer, light such as back light can be effectively used for displaying an image of a liquid crystal display, and a screen can be made bright.

A diffusion plate may also be prepared between the brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflective type elliptically polarizing plate or a semi-transmission type elliptically polarizing plate, etc. in which the above-mentioned reflective type polarizing plate or a transflective type polarizing plate is combined with above described retardation plate respectively.

Although a laminating of the above described hard coat film to the optical element may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

Although the hard coat film is provided on at least one side of the optical film element such as the polarizing plate mentioned above or the optical film comprising at least polarizing plate laminated, on the other side not prepared the hard coat film, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to the optical element such as the polarizing plate and the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on the optical element using suitable developing methods, such as flow method and coating method, or a method in which an adhesive layer is once formed on a separator, as mentioned above, and is then transferred on the optical element, may be mentioned. An adhesive layer may also be prepared on each layer as a layer in which pressure sensitive adhesives with different composition or different kind etc. are laminated together. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer, a transparent protective film and an optical layer etc. forming the optical layer element and an adhesive layer, using a method of adding UV absorbents, such as salicylic acid ester type compounds, benzophenol type compounds, benzotriazol type compounds, cyano acrylate type compounds, and nickel complex salt type compounds.

An optical element comprising the hard coat film of the present invention may be preferably used for manufacturing various equipments, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical element by the present invention is used, there is especially no limitation to use any conventional methods. Also any liquid crystal cell of arbitrary type, such as TN type, and STN type, n type may be used.

Suitable liquid crystal displays, such as liquid crystal display with which the above-mentioned optical element has been located at one side or both sides of the liquid crystal cell, and with which a backlight or a reflector is used for a lighting system may be manufactured. In this case, the optical element by the present invention may be installed in one side or both sides of the liquid crystal cell. When installing the optical elements in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Description will be given of examples of the invention below. Note that "part or parts" and "%" means units based on weight unless otherwise specified.

Example 1

(Transparent Plastic Film Substrate)

Used as the substrate was a tryacetyl cellulose film having a refractive index of 1.48 and a thickness of 80 μm.

(Hard Coat Layer Forming Material)

Diluted with a mixed solvent including butyl acetate and methyl ethyl ketone at a weight ratio of 1 to 2 were 100 parts of urethane acrylate obtained from pentaerythritol-based acrylate and hydrogenated xylene diisocyanate as urethane acrylate (A), 20 parts of isocyanuric acid-tris[2-(acryloyloxy) ethyl] as isocyanuric acid acrylate (B), silica ultrafine particles with an average particle diameter in the range of from 10 to 20 nm as inorganic ultrafine particles (C) in a content of 40% relative to all the solid matter and a polymerization initiator (with a trade name of IRUGACURE 184, manufactured by Ciba Specialty Chemicals Inc.) in a content of 3% relative to all the solid matter, so as to obtain a solution with a solid matter concentration of 45% to thereby prepare a hard coat forming material (in the state of a solution).

(Fabrication of Hard Coat Film)

The above hard coat layer forming material was coated on a surface of the above transparent plastic film substrate with a bar coater, the wet coat is dried by heating at 100° C. for 1 min, thereafter the coat was irradiated with ultraviolet from a metal halide lamp to an accumulated light dose of 300 mJ/cm$^2$ for curing to thereby obtain a hard coat film on which a hard coat layer with a thickness of 20 μm is formed.

Example 2

(Hard Coat Layer Forming Material)

A hard coat layer forming material was prepared in a similar way to that in Example 1 with the exception that, in preparation of the hard coat layer forming material in Example 1, a quantity of use of isocyanuric acid acrylate (B) was altered to 10 parts by weight and besides, 8 parts by weight of pentaerythritol tetraacrylate was added.

(Fabrication of Hard Coat Film)

A hard coat film was obtained in a similar way to that in Example 1 with the exception that in Example 1, the above hard coat layer forming material was used and a thickness of the hard coat layer was altered to 18 μm.

Example 3

(Transparent Plastic Film Substrate)

A tryacetyl cellulose film having a refractive index of 1.65 and a thickness of 75 μm was used.

(Hard Coat Layer Forming Material)

A hard coat layer forming material was prepared in a similar way to that in Example 1 with the exception that, in preparation of the hard coat layer forming material in Example 1, ultrafine particles of titanium oxide in the range of 10 to 20 nm in average particle diameter were used as inorganic ultrafine particles (C) in a content of 36% relative to all the resin components.

(Fabrication of Hard Coat Film)

A hard coat film was obtained in a similar way to that in Example 1 with the exception that in Example 1, the above transparent plastic film substrate and the above hard coat layer forming material were used and a thickness of the hard coat layer was altered to 21 μm.

Example 4

(Fabrication of Hard Coat Film)

A hard coat film was obtained in a similar way to that in Example 1 with the exception that in Example 1, a thickness of the hard coat layer was altered to 42 μm.

Example 5

(Fabrication of Hard Coat Film)

A hard coat film was obtained in a similar way to that in Example 1 with the exception that in Example 1, a thickness of the hard coat layer was altered to 31 μm.

Example 6

(Hard Coat Layer Forming Material)

A hard coat forming material was prepared in a similar way to that in Example 1 with the exception that, in preparation of the hard coat layer forming material in Example 1, a quantity of use of inorganic ultrafine particles (C) was altered to 50% relative to all the resin components.

(Fabrication of Hard Coat Film)

A hard coat film was obtained in a similar way to that in Example 1 with the exception that in Example 1, the above hard coat layer forming material was used and a thickness of the hard coat layer was altered to 19 μm.

Example 7

(Hard Coat Layer Forming Material)

A hard coat forming material was prepared in a similar way to that in Example 1 with the exception that, in preparation of the hard coat layer forming material in Example 1, a quantity of use of inorganic ultrafine particles (C) was altered to 20% relative to all the resin components.

(Fabrication of Hard Coat Film)

A hard coat film was obtained in a similar way to that in Example 1 with the exception that in Example 1, the above hard coat layer forming material was used.

Example 8

The following antireflection layer forming material was coated on the hard coat layer of the hard coat film obtained in Example 1 with a bar coater, the wet coat is dried and cured by heating at 120° C. for 3 min to thereby obtain an antireflection hard coat film having an antireflection layer with a thickness of 98 nm.

(Antireflection Layer Forming Material)

Dispersed into a mixed solvent including isopropyl alcohol, butyl acetate and methyl isobutyl ketone at ratio of 54 to 14 to 32 in wt were 54 parts of tetraalcoxysilane, 23 parts of a silane coupling agent having a fluoroalkyl structure and a polysiloxane structure and 23 parts of silicon oxide ultrafine particles each in the shape of a hollow sphere with a diameter 60 nm, which has been hyrophobicized by applying thereto a surface treatment with a silane coupling agent having an acrylic group in the molecule so that the dispersion was adjusted to a solid matter concentration of 2.0% to thereby obtain an antireflection layer forming material.

Example 9

(Hard Coat Layer Forming Material)

A hard coat layer forming material was prepared in a similar way to that in Example 1 with the exception that, in preparation of the hard coat layer forming material in Example 1, titanium oxide ultrafine particles with an average particle diameter in the range of from 10 to 20 nm as inorganic ultrafine particles (C) were added in a content of 36% relative to all the resin components.

(Fabrication of Hard Coat Film)

A hard coat film was obtained in a similar way to that in Example 1 with the exception that in Example 1, the above transparent plastic film substrate and the above hard coat layer forming material were used and a thickness of the hard coat layer was altered to 21 μm.

Example 10

(Hard Coat Layer Forming Material)

A hard coat layer forming material was prepared in a similar way to that in Example 1 with the exception that in preparation of the hard coat layer forming material in Example 1, silica ultrafine particles with an average particle diameter in the range of from 200 to 300 nm in a content of 40% relative to all the resin components were mixed in place of inorganic ultrafine particles (C).

(Fabrication of Hard Coat Film)

A hard coat film was obtained in a similar way to that in Example 1 with the exception that in Example 1, the above hard coat layer forming material was used.

Comparative Example 1

(Hard Coat Layer Forming Material)

A hard coat layer forming material was prepared in a similar way to that in Example 1 with the exception that in preparation of the hard coat layer forming material in Example 1, no inorganic ultrafine particles (C) were mixed.

(Fabrication of Hard Coat Film)

A hard coat film was obtained in a similar way to that in Example 1 with the exception that in Example 1, the above hard coat layer forming material was used and a thickness of the hard coat layer was altered to 21 μm.

Comparative Example 2

(Hard Coat Layer Forming Material)

A hard coat layer forming material was prepared in a similar way to that in Example 1 with the exception that in preparation of the hard coat layer forming material in Example 1, no isocyanuric acid acrylate (B) was mixed and instead, 20 parts by weight of pentaerythritol tetraacrylate was mixed.

(Fabrication of Hard Coat Film)

A hard coat film was obtained in a similar way to that in Example 1 with the exception that in Example 1, the above hard coat layer forming material was used and a thickness of the hard coat layer was altered to 19 μm.

Comparative Example 3

(Hard Coat Layer Forming Material)

A hard coat layer forming material was prepared in a similar way to that in Example 1 with the exception that, in preparation of the hard coat forming material in Example 1, nether isocyanuric acid acrylate (B) nor inorganic ultrafine particles (C) were mixed and instead, 20 parts by weight of pentaerythritol tetraacrylate was mixed.

(Hard Coat Film Preparation)

A hard coat film was obtained in a similar way to that in Example 1 with the exception that in Example 1, the hard coat forming material was used.

Comparative Example 4

(Hard Coat Layer Forming Material)

Diluted with a mixed solvent including butyl acetate were 100 parts by weight of dipentaerythritol hexaacrylate and 4 parts by weight of a polymerization initiator (with a trade name of IRUGACURE 184, manufactured by Ciba Specialty Chemicals Inc.), so as to obtain a solution with a solid matter concentration of 45% to thereby prepare a hard coat forming material (in the state of a solution).

(Hard Coat Film Fabrication)

A hard coat film was obtained in a similar way to that in Example 1 with the exception that in Example 1, the hard coat layer forming material was used.

The following methods were applied in measurement of refractive indices and thickness values concerning the hard coat films and the antireflection hard coat films having been fabricated above. In Table 1, there are shown values of the measurement. In Table 2, there are shown respective components included in the hard coat layer forming materials.

(Refractive Index)

An Abbe's refractometer manufactured by Atago Co., Ltd. was used to conduct measurement according to the specific instructions indicated on the refractometer wherein measurement light was directed to a measurement surface of a transparent plastic film substrate and a hard coat layer.

(Thickness of Hard Coat Layer)

A thickness gauge (microgauge type manufactured by Mitutoyo Corporation) was used for measurement. Each hard coat film with the hard coat layer formed on the transparent plastic film substrate was measured for thickness, and the thickness of the hard coat layer was calculated by subtracting the thickness of the transparent substrate from the measured thickness.

(Thickness of Antireflection Layer)

An instantaneous multichannel photodetector system (MCPD-2000 (trade name) manufactured by Otsuka Electronics Co., Ltd.) was used, and the thickness was calculated from the waveform data of the resulting interference spectrum.

The following evaluations were conducted on the obtained hard coat films (including the antireflection hard coat films). In Table 1, there are shown the results.

(Pencil Hardness)

The surface on which the hard coat layer of the hard coat film was not formed was placed on a glass plate, and then the surface of the hard coat layer (or the antireflection layer) was subjected to a pencil hardness test according to JIS K-5400.

(Curling)

Each hard coat film was cut into 10 cm square pieces. The piece was placed on a glass plate with its hard coat layer (or antireflection layer) facing upward. The length (mm) of elevation of each of the four corners from the glass plate was measured, and the average value was used as an index for the evaluation of curling. The rounded piece was defined as "incapable of measurement."

(Flexibility)

Each hard coat film was wound directly on metal rolls different in diameter with its transparent plastic film substrate placed inside, and the presence or absence of cracking in the hard coat layer (or antireflection layer) was visually determined. The diameter for no cracking was used as the value of flexibility.

(Haze)

A haze meter (HR300 manufactured by Murakami Color Research Laboratory) was used for measurement according to JIS K7136 (haze (cloudiness)).

(Interference Fringes)

A black acrylic plate with a thickness of 2.0 mm, manufactured by Mitsubishi Rayon Co., Ltd., was adhered on a surface, on which a hard coat layer of a hard coat film was not formed, of the hard coat film with a pressure sensitive adhesive with a thickness of about 20 μm so as to acquire a rear surface with no reflection thereon and a surface state of the hard coat layer (or the antireflection layer) under illumination of three wavelength fluorescent was visually evaluated with the following criteria:

○: a change in pale interference color is recognized on the surface of the hard coat layer or interference fringes are almost not conspicuous ×: interference fringes can be recognized at a spacing of several mm or several cm.

(Reflectance)

A black acrylic plate manufactured by Mitsubishi Rayon Co., Ltd. (2.0 mm in thickness) was adhered with a pressure-sensitive adhesive about 20 μm in thickness to the hard coat film surface on which no hard coat layer was formed. The resulting laminate with no reflection from the adhered back side was measured for reflectance of the surface of the hard coat layer (or the antireflection layer). The spectral reflectance (specular reflectance+diffuse reflectance) was measured using a spectrophotometer (UV2400PC with an 8°-inclined integrating sphere, manufactured by Shimadzu Corporation), and the reflectance was calculated according to the formula: C illuminant/total reflection index of 2° visual field (Y value).

TABLE 1

| | Film substrate | | Hard coat layer | | | Evaluations | | | | | |
|---|---|---|---|---|---|---|---|---|---|---|---|
| | | | | | | | | Bend ability | | | |
| | Material | Refractive index | Refractive index | Thickness (μm) | Antireflection layer | Pencil hardness | Curling (mm) | (mm in φ) | Haze | Reflectance (%) | Interference fringes |
| Example 1 | TAC | 1.48 | 1.5 | 20 | Not provided | 3H | 3.75 | 9.5 | 0.2 | 4 | ○ |
| Example 2 | TAC | 1.48 | 1.5 | 18 | Not provided | 3H | 12 | 9.5 | 0.1 | 4 | ○ |
| Example 3 | PET | 1.64 | 1.62 | 21 | Not provided | 3H | 4.2 | 9.5 | 0.2 | 9 | ○ |
| Example 4 | TAC | 1.48 | 1.5 | 42 | Not provided | 4H | 4.1 | 12 | 0.4 | 4 | ○ |
| Example 5 | TAC | 1.48 | 1.5 | 31 | Not provided | 3H | 3.9 | 12 | 0.4 | 4 | ○ |
| Example 6 | TAC | 1.48 | 1.5 | 19 | Not provided | 3H | 3.5 | 14 | 0.4 | 4 | ○ |

TABLE 1-continued

| | Film substrate | | Hard coat layer | | | Evaluations | | | | | |
|---|---|---|---|---|---|---|---|---|---|---|---|
| | Material | Refractive index | Refractive index | Thickness (μm) | Antireflection layer | Pencil hardness | Curling (mm) | Bend ability (mm in φ) | Haze | Reflectance (%) | Interference fringes |
| Example 7 | TAC | 1.48 | 1.5 | 20 | Not provided | 3H | 8.6 | 6.5 | 0.2 | 4 | ○ |
| Example 8 | TAC | 1.48 | 1.5 | 20 | Provided | 4H | 1.3 | 9.5 | 0.2 | 1.6 | ○ |
| Example 9 | TAC | 1.48 | 1.62 | 21 | Not provided | 3H | 5.1 | 9.1 | 0.2 | 9.3 | x |
| Example 10 | TAC | 1.48 | 1.5 | 20 | Not provided | 3H | 4.05 | 9.1 | 1.6 | 4 | ○ |
| Comparative Example 1 | TAC | 1.48 | 1.51 | 21 | Not provided | 3H | 17.8 | 12.5 | 0.2 | 4.1 | ○ |
| Comparative Example 2 | TAC | 1.48 | 1.5 | 19 | Not provided | 3H | 16.75 | 14 | 0.3 | 4 | ○ |
| Comparative Example 3 | TAC | 1.48 | 1.51 | 20 | Not provided | 3H | 20.5 | 9.5 | 0.3 | 4.1 | ○ |
| Comparative Example 4 | TAC | 1.48 | 1.53 | 20 | Not provided | 4H | incapable of measurement | 21.5 | 0.1 | 4.3 | ○ |

In Table 1, TAC means triacetyl cellulose and PET means polyethylene terephthalate.

TABLE 2

| | Component (A) Mixing parts | Component (B) Mixing parts | Components (C) | | | Other additive components | | Initiator |
|---|---|---|---|---|---|---|---|---|
| | | | Material | Particle diameter (nm) | Content (wt %) | Resin component | Mixing parts | Mixing parts |
| Example 1 | 100 | 20 | Silica | 10 to 20 | 40 | — | — | 3 |
| Example 2 | 100 | 10 | Silica | 10 to 20 | 40 | PETA | 8 | 3 |
| Example 3 | 100 | 20 | Titanium oxide | 10 to 20 | 36 | — | — | 3 |
| Example 4 | 100 | 20 | Silica | 10 to 20 | 40 | — | — | 3 |
| Example 5 | 100 | 20 | Silica | 10 to 20 | 40 | — | — | 3 |
| Example 6 | 100 | 20 | Silica | 10 to 20 | 50 | — | — | 3 |
| Example 7 | 100 | 20 | Silica | 10 to 20 | 20 | — | — | 3 |
| Example 8 | 100 | | Silica | 10 to 20 | 40 | — | — | 3 |
| Example 9 | 100 | 20 | Titanium oxide | 10 to 20 | 36 | — | — | 3 |
| Example 10 | 100 | 20 | Silica | 200 to 300 | 40 | — | — | 3 |
| Comparative Example 1 | 100 | 20 | — | — | — | — | — | 3 |
| Comparative Example 2 | 100 | — | Silica | 10 to 20 | 40 | PETA | 20 | 3 |
| Comparative Example 3 | 100 | — | — | — | — | PETA | 20 | 3 |
| Comparative Example 4 | — | — | — | — | — | DETA | 100 | 4 |

In Table 2, PETA means pentaerythritol tetraacrylate and DPEA means dipentaerythritol hexaacrylate.

INDUSTRIAL APPLICABILITY

A hard coat film and an antireflection hard coat film of the invention are applied to an optical element such as a polarizing plate, and preferably used in image display, especially in CRT, a liquid crystal display (LCD), plasma display (PDP), an EL display (ELD) and others.

The invention claimed is:

1. A hard coat film comprising a hard coat layer, which is a cured coat layer, provided on at least one side of a transparent plastic film substrate, wherein
    a hard coat layer forming material comprises: urethane acrylate (A); isocyanuric acid acrylate (B) and inorganic ultrafine particles (C), and
    a mixing quantity of the isocyanuric acid acrylate (B) is about in the range of from 5 to 25 parts by weight relative to 100 parts by weight of the urethane acrylate (A),
    a mixing quantity of the inorganic ultrafine particles (C) is about in the range of from 10 to 60 parts by weight relative to all resin components in a hard coat forming material, and
    a difference in refractive index between the transparent plastic film substrate and the hard coat layer is 0.04 or less.

2. The hard coat film according to claim 1, wherein the ultrafine particles (C) are at least one metal oxide selected from the group consisting of titanium oxide, silicon oxide, aluminum oxide, zinc oxide, tin oxide and zirconium oxide.

3. The hard coat film according to claim 1, wherein an average particle diameter of inorganic ultrafine particles (C) is 100 nm or less.

4. The hard coat film according to claim 1, wherein a thickness of the hard coat layer is in the range of from 15 to 50 μm.

5. The hard coat film according to claim 1, having a pencil hardness of 4H or higher.

6. An antireflection hard coat film comprising the hard coat film according to claim 1 and an antireflection layer formed on the hard coat layer of the hard coat film.

7. The antireflection hard coat film according to claim 6, wherein ultrafine particles of silicon oxide each in the shape of a hollow sphere are contained in the antireflection layer.

8. An optical element comprising the hard coat film according to claim 1 laminated on one side or both sides of an optical element.

9. An optical element comprising the antireflection hard coat film according to claim 6 laminated on one side or both sides of an optical element.

10. An image display comprising a hard coat film according to claim 1.

11. An image display comprising a hard coat film according to claim 2.

12. An image display comprising a hard coat film according to claim 3.

13. An image display comprising a hard coat film according to claim 4.

14. An image display comprising a hard coat film according to claim 5.

15. An image display comprising an antireflection hard coat film according to claim 6.

16. An image display comprising an antireflection hard coat film according to claim 7.

17. An image display comprising an optical element according to claim 8.

18. An image display comprising an optical element according to claim 9.

* * * * *